United States Patent [19]

Baron

[11] Patent Number: 5,570,138
[45] Date of Patent: Oct. 29, 1996

[54] COMBINATION OUTDOOR DAYTIME/NIGHTTIME ADVERTISING BILLBOARD

[76] Inventor: Hal Baron, 14524 Benefit St., Sherman Oaks, Calif. 91403

[21] Appl. No.: 191,869

[22] Filed: Feb. 4, 1994

[51] Int. Cl.[6] ................................................ H04N 5/74
[52] U.S. Cl. ...................... 348/744; 40/560; 359/449; 353/28
[58] Field of Search ........................ 348/61, 744, 776, 348/781; 353/28; 40/560; 359/449; H04N 5/74, 9/31

[56] References Cited

U.S. PATENT DOCUMENTS

| | | | |
|---|---|---|---|
| 1,026,126 | 5/1912 | Roffy. | |
| 2,491,184 | 12/1949 | Joss | 88/18.7 |
| 3,020,798 | 2/1962 | Chrisman | 88/24 |
| 3,069,970 | 12/1962 | Pierson | 88/24 |
| 3,198,066 | 8/1965 | McGhee | 88/24 |
| 4,516,156 | 5/1985 | Fabris et al. | 348/211 |
| 4,739,567 | 4/1988 | Cardin | 40/471 |
| 5,257,017 | 10/1993 | Jones et al. | 348/744 |

*Primary Examiner*—Victor R. Kostak
*Attorney, Agent, or Firm*—Lewis Anten, Esq.; Amedeo Ferraro, Esq.

[57] ABSTRACT

A combination outdoor daytime/nighttime outdoor advertising display billboard is provided having a surface for displaying a fixed image during the daytime and a projection screen apparatus which automatically unrolls to present a projection screen for displaying a projected image during the nighttime. A projector placed in front of the billboard functions to project one or more images onto the projection screen. The projection screen and the projector are controlled by a photoelectric sensors that automatically unrolls the projection screen and activates the projector during the nighttime and automatically rolls up the projection screen and deactivates the projection means during the daytime.

11 Claims, 2 Drawing Sheets

COMBINATION OUTDOOR DAYTIME/NIGHTTIME ADVERTISING BILLBOARD

BACKGROUND OF THE INVENTION

1. Field of the Invention

This invention relates to advertising display systems, and more particularly to a combination outdoor daytime/nighttime advertising display apparatus capable of displaying both a fixed image and a projected image.

2. Description of the Related Art

In the past a number of attempts have been made to create an outdoor advertising device that is capable of changing the various images being displayed and that has a conventional printed display and is also capable of projecting an image, which can be changed, onto a screen associated with the billboard during the nighttime. Examples of such devices include the following:

The patent to McGhee U.S. Pat. No. 3,198,066, issued on Aug. 3, 1965, discloses an outdoor advertising sign having a display comprising a screen that is permanently positioned in the area normally having a fixed display surface for printed or painted images in conventional billboards. The screen has portions comprising a blank projection surface, while other portions have fixed advertising images. The fixed advertising images are printed, painted or affixed directly to the surface of the screen and are rolled or unrolled with the screen as different portions of the screen are displayed. Power driven means automatically operate the rollers to reel the screen between a position for displaying the blank projection surface portion during the nighttime and a position for displaying the fixed printed advertising image portion during the daytime. A projection device is fixed on a bracket in front of the screen. A photoelectric cell, when actuated by light, activates the power driven means and the projection device.

The patent to Joss U.S. Pat. No. 2,491,184, issued on Dec. 13, 1949, discloses a retractable curtain, capable of being retracted during daylight hours to expose a fixed image billboard surface, that could also be used as the projection surface.

The patent to Pierson U.S. Pat. No. 3,069,970, issued on Dec. 25, 1962, discloses an enclosed room having a projector at one end and a translucent screen viewable from the outside of the room at the other end. A billboard bearing a fixed advertising image is hinged along one edge to enable it to be swung into close adjacent contact with the translucent screen for viewing from the outside during daylight hours.

The patent to Chrisman U.S. Pat. No. 3,020,798, issued on Feb. 13, 1962, discloses a billboard having a projection screen for displaying a projected image thereon. However, the projection screen is always kept in place and is not moveable.

The patent to Cardin U.S. Pat. No. 4,739,567, issued on Apr. 26, 1988, discloses a combination daytime/nighttime image projection system for a building display window.

The patent to Roffy U.S. Pat. No. 1,026,126, issued on May 14, 1912, discloses an advertisement displaying apparatus in which an image is projected onto a fixed surface.

None of the prior art devices teach a combination outdoor daytime/nighttime advertising display apparatus having an automatically activated projector means and an automatically activated projection screen that covers the fixed display surface of a conventional billboard during the nighttime that is automatically deactivated during the daytime to display the fixed display image of the billboard unobstructed during the daytime.

SUMMARY OF THE INVENTION

The present invention discloses a combination outdoor daytime/nighttime advertising display apparatus comprising a billboard having a surface for displaying a fixed image during the daytime and a projection screen apparatus which automatically unrolls to present a projection screen for displaying a projected image during the nighttime. The projection screen is an overlay that covers the surface of the billboard for displaying a fixed image only when it is unrolled to present a projection screen during the nighttime. During the daytime, the projection screen does not obstruct the surface for displaying a fixed image such that the billboard may be used in the conventional manner. The positioning of the projection screen apparatus is controlled by a photoelectric sensing means that automatically positions the projection screen during the nighttime and automatically removes the projection screen during the daytime.

A projection means, such as a slide projector, placed in front of the billboard functions to project one or more images onto the projection screen during nighttime. The projection means is actuated by a photoelectric sensing means in the absence of daylight such that the projection means is automatically activated at the same time as the projection screen. In the preferred embodiment of the present invention, the projection means is a high intensity slide projector, but the projection means can also be a television projector for projecting videotape or film images. Alternatively, both the projection screen and the projector means may be activated and remotely controlled via radio wave signals.

In an alternative embodiment of the present invention, the projection means includes an electronic receiver means capable of receiving television signals broadcast from a remote location, either across the air waves or by means of a cable connection. In this manner, the same images may be transmitted from a single location to more than one advertising display billboards of the present invention. Also, the particular display can be changed from a remote location.

OBJECTS OF THE PRESENT INVENTION

It is an object of the present invention to provide a combination outdoor daytime/nighttime advertising display apparatus for use with a conventional billboard that permits the conventional use of the billboard during the daytime.

It is another object of the present invention to provide a combination outdoor daytime/nighttime advertising display apparatus that is automatically activated in response to the presence or absence of daylight.

It is a further object of the present invention to provide a combination outdoor daytime/nighttime advertising display apparatus capable of displaying a projected image.

It is yet another object of the present invention to provide a combination outdoor daytime/nighttime advertising display apparatus capable of displaying a projected image that is transmitted from a remote location.

It is still a further object of the present invention to provide a combination outdoor daytime/nighttime advertising display apparatus system wherein an image that is transmitted from a remote location may be projected onto more than one advertising display apparatus system at the same time.

These and other objects of the present invention will become apparent from a review of the accompanying drawings and the detailed description of the drawings.

DETAILED DESCRIPTION OF THE DRAWINGS

Figure 1:
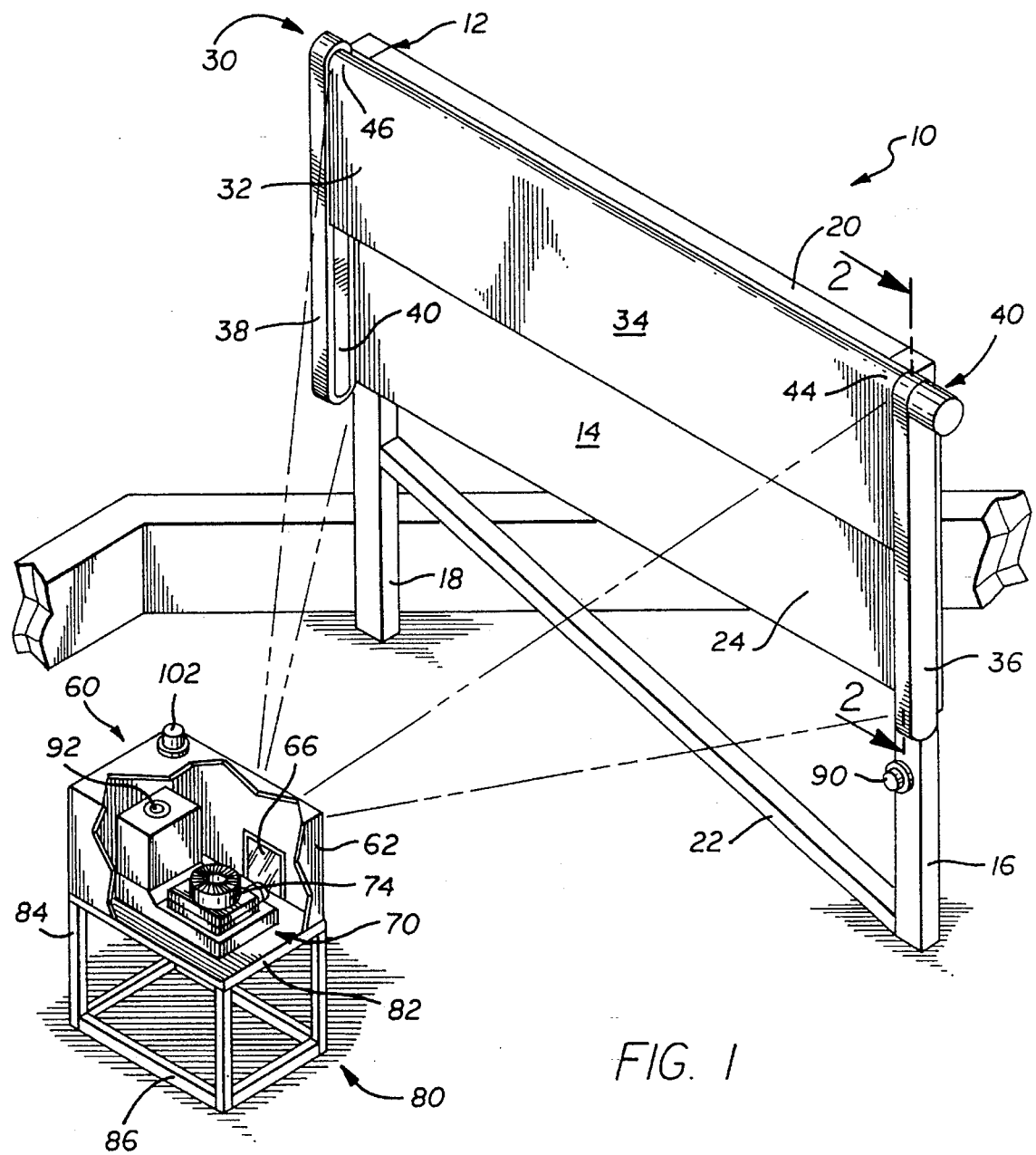
FIG. 1 is a front perspective view of the combination outdoor daytime/nighttime advertising display apparatus of the present invention showing a fixed display surface covered by a projection screen shown in a partially lowered position.

Referring to FIG. 1, the preferred embodiment of the combination outdoor daytime/nighttime advertising display apparatus of the present invention is generally referred to by numeral 10. The advertising display apparatus 10 comprises a billboard 12 such as, but not limited to, the type of billboards that are commonly used for outdoor advertising along roadways or on rooftops of building structures. The billboard 12 has a fixed display surface 14 supported by a right side support member 16 and a left side support member 18. The right and left side support members 16, 18 are connected by the upper cross bar 20 and by lower cross bar 22.

The fixed display surface 14 is used to display a daytime image 24 that is usually either painted directly onto the display surface 14 or may be pre-printed and then adhered to the display surface by paste or glue, such as is commonly done in the industry for most advertisements.

Associated with the billboard 12 is a projection screen apparatus 30 for displaying a projected image. The projection screen apparatus 30 comprises a flexible, rollable screen 32 that is capable of being rolled and unrolled. The rollable screen 32 is an overlay that covers the fixed display surface 14 when it is unrolled, but does not cover nor obstruct the fixed display surface 14 when it is rolled such that the daytime image 24 may be displayed. In this manner, the billboard 12 may be used in the conventional manner during the daytime as it is unaffected by the presence of the projection screen apparatus 30.

The rollable screen 32 is supported by a right guide member 36 and a left guide member 38. Both right and left guide members 36 and 38 are attached to the right and left side support members 16 and 18 respectively. In addition to supporting the rollable screen 32, the right and left guide members 36 and 38 each have a rail 39 in which the outer edges of the rollable screen 32 are inserted and function to guide the rollable screen 32 as it is unrolled and rolled. The rollable screen 32 is operated by an automatic rolling means 40 which may be any automated means for rolling the rollable screen 32 well-known by those skilled in the art.

Figure 3:
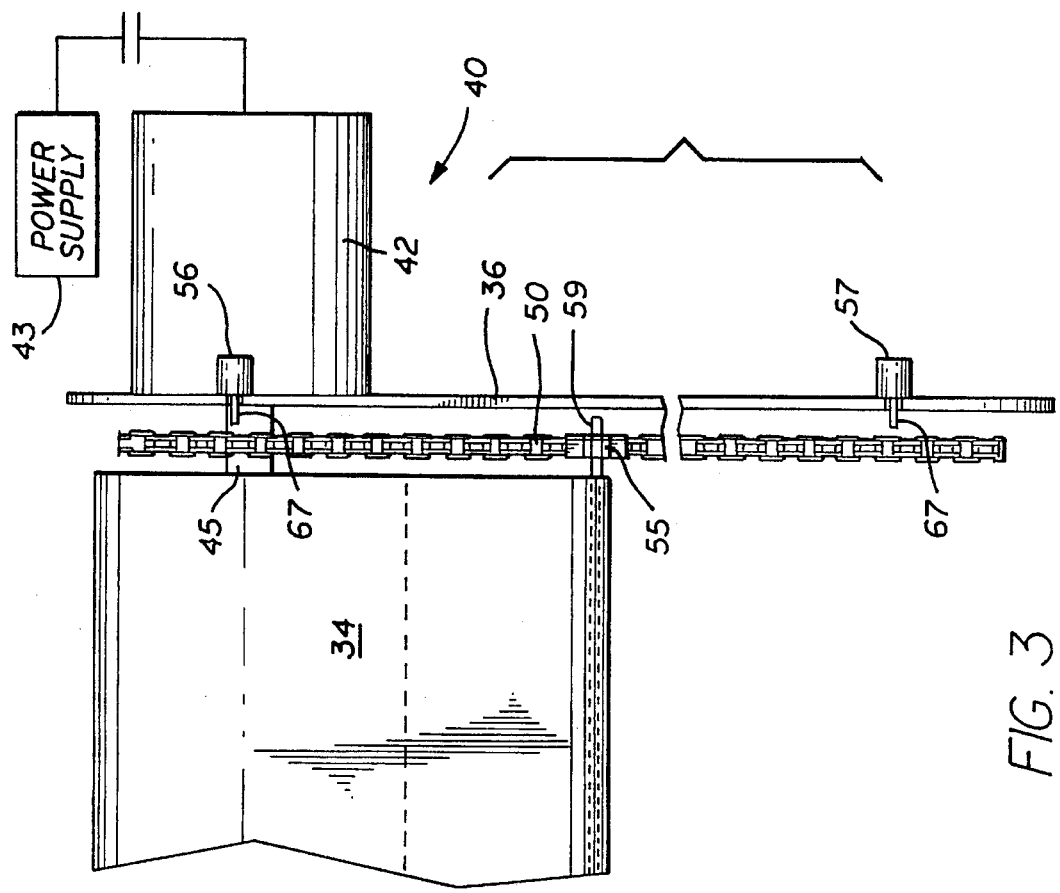
FIG. 3 is a detailed front elevational view of the projection screen apparatus of the present invention along lines 3—3 of FIG. 2.
Figure 2:
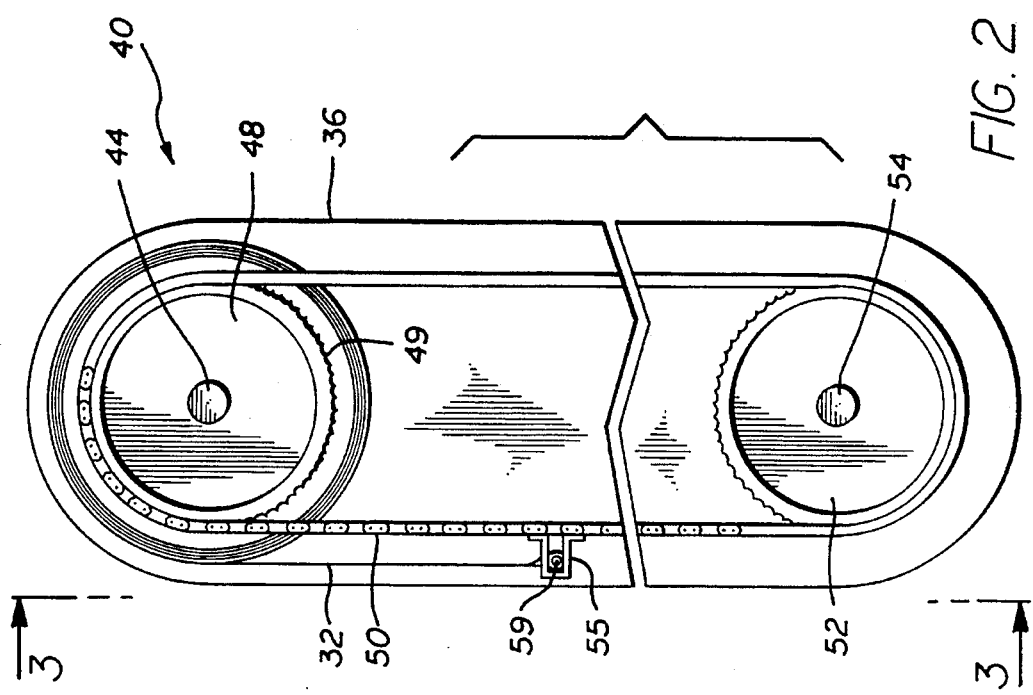
FIG. 2 is a side elevational view of the projection screen apparatus of the present invention along lines 2—2 of FIG. 1.

Referring to FIGS. 2–3, an enlarged view of the automatic rolling means 40 used to raise and lower the rollable screen 32 is shown. In the preferred embodiment of the present invention, the automatic rolling means 40 has an electric motor 42 connected to a standard power supply 43. The electric motor 42 is coupled to a first end 44 of a cam 45 which spans the distance between the right and left guide members 36 and 38 along the cross bar 20. The cam 53 is coaxial with the electric motor 42 and functions to roll or unroll the screen 32 which coils about the cam 45. As the second end 46 of the cam 45 is identical to the first end 44, the automatic rolling means 40 and its related elements located at the first end 44 are identical to the elements of the rolling means 40 located at the second end 46 of the cam 45, the description of the elements of the automatic rolling means 40 located at the first end of the cam 45 applies equally to the elements of the automatic rolling means 40 located at the second end 46 of the cam 45.

Attached to the first end 44 of the cam 45 is a first sprocket 48 having a plurality of teeth 49 that function to engage and drive a chain 50. The chain 50 is a closed loop that interdigitates with the teeth 49 and partially encircles the sprocket 48 near the top of the right guide member 36.

At the bottom of the right guide member 36, a second sprocket 52, having teeth 53 and identical to the first sprocket 48, is attached to the right guide member 36 by an axle 54 about which the second sprocket 52 freely rotates. The chain 50 interdigitates and partially encircles the second sprocket 52 near the bottom of the right guide member 36. The second sprocket 52 functions to guide and return the chain 50 towards the first sprocket 52 as it is being driven by the electric motor 42.

The rollable screen 32 is attached to the chain 50 by a bracket 55 so that as the chain 50 is driven, the rollable screen 32 rolls or unrolls in conjunction with the motion of the chain 59. On one side of the bottom edge 33 of the screen 32 is a contact pin 59 protruding from the bracket 55. The contact pin 59 functions to activate conventional electronic limiting switches 56 and 57 once the contact pin 59 comes into contact with either of the limiting switches 56 or 57.

The limiting switches 56 and 57 are used to start and stop the motor 52 such as commonly used in garage doors. The rollable screen 32 is unrolled by the automatic rolling means 40 until the rollable screen 32 reaches the limiting switch 57 and stops. Similarly, when the rollable screen 32 is unrolled, the rollable screen 32 stops when it has reached the limiting switch 57.

The automatic rolling means 40 is controlled by a photoelectric sensing means 90 such as a photoelectric cell capable of automatically activating the automatic rollable means in the presence or absence of daylight. For example, in the nighttime, the photoelectric sensing means 90 detects the absence of daylight and activates the automatic rolling means 40 to unroll the rollable screen 32 so the projection image display surface 34 covers the fixed image display surface 14 of the billboard. When daylight appears, the photoelectric sensing means 90 activates the automatic rolling means 40 to roll the rollable screen 32 so that the fixed image display surface 14 is uncovered and capable of being viewed. When the rollable screen 32 in unrolled, it covers the fixed display surface 14 and presents a projected image display surface 34. In the preferred embodiment, the projected image display surface 34 is an outdoor movie screen capable of resisting damage caused by adverse outdoor weather conditions and capable of presenting a projected image with high image resolution.

Referring again to FIG. 1, for the nighttime presentation of images onto the rollable screen 32, a projection apparatus 60 capable of projecting images of light is placed at a sufficient distance in front of the billboard 12. The projection apparatus 60 comprises a housing means 62 for containing a projector means 70 and has a window 64 to permit light to be passed. The housing means 62 is water proof and insulated to protect the projector means 70 from adverse outdoor weather conditions.

In the preferred embodiment, the projector means 70 comprises a high intensity slide projector 70 such as, but not limited to the Xenographinc XL Professional High-Intensity Slide Projection System, available from Optical Radiation Corporation, Azusa, Calif. Preferably, more than one projector 70 is used to provide multi-image presentations or animation presentations.

The projector means 70 has a variable field lens 72 positioned in the housing means 62 directly behind the window 64. The images desired to be projected are in the form of a photograph slide and contained within the carousel 74. The slides may be presented for variable period of time which may be preprogrammed so that the images projected onto the rollable screen 32 may be changed at varying intervals of time. It is appreciated that the projector means 70 instead of being a slide projector may be a television projector capable of projecting images from a videotape player or from a film.

The projector means 70 is actuated by a photoelectric sensing means 92 in the absence of daylight, such that the projector means 70 is activated at the same time as the automatic rolling means 40 unrolls the projection screen 32. Alternatively, both the projection screen 32 and the projector means 70 may be activated and remotely controlled via radio wave signals.

The housing means 62 is supported at the appropriate height by a support base 80 having a top surface 82 for supporting the housing means. The top surface 82 is kept elevated by the legs 84 which are connected to one another by the cross braces 86 to stabilize the support base 80.

Figure 4:
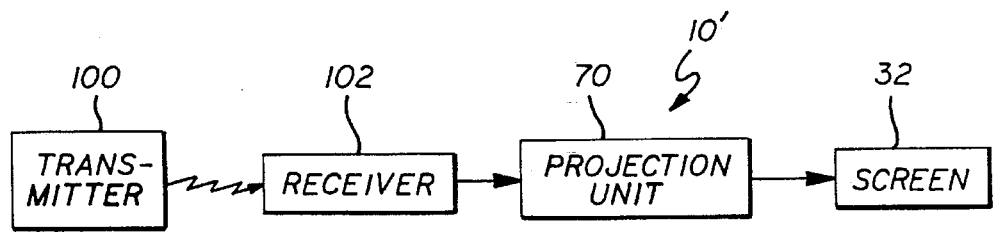
FIG. 4 is schematic representation of an alternative embodiment of the advertising display apparatus of the present invention including a transmitter and receiving means.

Referring to FIG. 4, represented by a schematic diagram, is an alternative embodiment of the advertising apparatus 10' is shown. The adverting apparatus 10' comprises the same features of the advertising apparatus 10 of the preferred embodiment and further includes a transmitting means 100 for transmitting television signals to a receiver 102 connected to the projection means 70. The transmitting means 100 may broadcast signal across the airwaves or may connected via a cable to the receiver 102. In this manner more than one advertising apparatus 10' may display projected images transmitted from a remote location. Also, in this embodiment, the particular display can be changed from a remote location.

While the present invention has been described in detail with regards to the preferred embodiment, it is appreciated that other variations of the present invention may be devised which do not depart from the inventive concept of the present invention.

What is claimed is:

1. A combination daytime/nighttime outdoor advertising apparatus comprising:

a fixed display means providing a first surface for displaying a fixed image;

projection screen means for displaying a projected image, said projection screen means capable of being moved from a first position to a second position covering said fixed display means so as to permit the display of a projected image on said projection screen means;

operating means for moving said projection screen means from its first position to its second position;

control means for controlling said position of said projection screen means; and projection means for projecting an image onto said projection screen means.

2. The outdoor advertising apparatus of claim 1 in which said control means comprises a photoelectric means for controlling said operating means, said photoelectric means being responsive to the absence or presence of daylight.

3. The outdoor advertising apparatus of claim 1 in which said projection means comprises a photoelectric means for controlling the operation of said projection means, said photoelectric means being responsive to the absence or presence of daylight.

4. The outdoor advertising apparatus of claim 1 in which said control means comprises is activated and remotely controlled via radio wave signals.

5. The outdoor advertising apparatus of claim 1 in which said projection means comprises means for remotely controlling said projection means via radio wave signals.

6. The outdoor advertising apparatus of claim 1 in which said projection means includes a receiving means for receiving television signals broadcast from a remote location.

7. The outdoor advertising apparatus of claim 6 in which said receiving means includes a television cable transmission means.

8. The outdoor advertising apparatus of claim 6 in which said receiving means includes an antenna for receiving television broadcast signals.

9. The outdoor advertising apparatus of claim 6 in which said projection means is a slide projector.

10. The outdoor advertising apparatus of claim 1 in which said projection means is a video tape projector.

11. The outdoor advertising apparatus of claim 1 in which said projection means is a television projector.

* * * * *